S. YAI.
DRY BATTERY.
APPLICATION FILED JAN. 13, 1921.
1,431,859.
Patented Oct. 10, 1922.
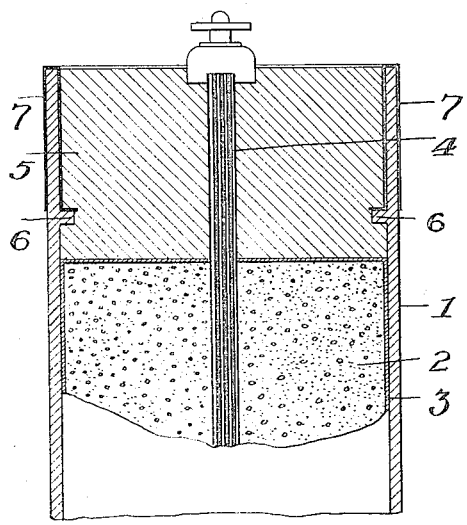
INVENTOR
Sakizo Yai,
BY B. Singer,
ATTORNEY Patented Oct. 10, 1922.

1,431,859

UNITED STATES PATENT OFFICE.

SAKIZO YAI, OF TOKYO, JAPAN.

DRY BATTERY.

Application filed January 13, 1921. Serial No. 437,045.

*To all whom it may concern:*

Be it known that I, SAKIZO YAI, a subject of the Emperor of Japan, and a resident of No. 2, 1-Chome, Nishiki-Cho, Kanda-Ku, city of Tokyo, Empire of Japan, have invented new and useful Improvements in Dry Batteries, of which the following is a specification.

This invention relates to improvements in electric batteries of the dry cell type, and relates more particularly to the means of providing a tight joint between the inner wall of the outer casing and the material with which the open end of the outer casing is to be closed, and relates still more particularly to improvements in electric batteries of the class described in the United States Patent No. 1,328,027, issued to me on the 13th day of January, 1920.

The invention consists in the construction, combination and arrangement of devices hereinafter shown and described.

The accompanying drawing is an elevation, partly in vertical central section, of a dry battery constructed and arranged in accordance with my invention.

As described in the specification of my previous United States Patent No. 1,328,027, the outer casing 1 contains the mixture 2 of carbon and hydrogen absorbing material, such for instance, as a mixture of graphite and manganese peroxide. The lining 3 is of material which is adapted to absorb liquid and the negative pole 4 is placed within the black mixture 2.

The outer casing 1 whose open end is to be closed with a seal 5 of suitable material, preferably asphalt, is internally provided with a circumferential flange 6 adapted to engage corresponding groove which naturally has to be formed in the asphalt seal when the same is placed over the open end of the outer casing. Over the upper face of the said flange 6 and actually enveloping the outer and inner walls including the top edge of the outer casing I place a suitable insulating water proof paper or fabric 7 so that a tight joint is formed between the seal and the container wall.

Having thus described my invention, I claim:—

A dry battery having a container provided with an internal circumferential flange, an insulating waterproof fabric on the inner surface of the upper portion of the container and having a flange at the lower side bearing on that of the container, and a seal in the upper portion of the container and in which the said flanges are embedded.

In testimony whereof I affix my signature in presence of two witnesses.

SAKIZO YAI.

Witnesses:
H. YASUMENE,
EDWARD C. WYNNE.